United States Patent [19]

Tanahashi

[11] Patent Number: 4,632,423

[45] Date of Patent: Dec. 30, 1986

[54] STRUCTURE FOR MOUNTING STABILIZER IN VEHICLE SUSPENSION

[75] Inventor: Haruhiko Tanahashi, Toyota, Japan

[73] Assignee: Toyota Jidosha Kabushiki Kaisha, Toyota, Japan

[21] Appl. No.: 721,409

[22] Filed: Apr. 9, 1985

[30] Foreign Application Priority Data

Mar. 1, 1985 [JP] Japan .............................. 60-29611[U]
Apr. 3, 1985 [JP] Japan .................................. 60-70359

[51] Int. Cl.$^4$ ............................................ B60G 19/00
[52] U.S. Cl. ...................................... 280/689; 280/665
[58] Field of Search ....................... 280/689, 605, 726

[56] References Cited

U.S. PATENT DOCUMENTS

| 4,061,362 | 12/1977 | Bufler ................... | 280/689 |
| 4,153,272 | 5/1979 | Fiedler et al. ......... | 280/689 |
| 4,334,697 | 6/1982 | DeWeese .............. | 280/665 |
| 4,542,920 | 9/1985 | Kijima et al. ......... | 280/689 |

FOREIGN PATENT DOCUMENTS 44579  1/1982  European Pat. Off. ............ 280/689

Primary Examiner—John J. Love
Assistant Examiner—Ross Weaver
Attorney, Agent, or Firm—Oblon, Fisher, Spivak, McClelland & Maier

[57] ABSTRACT

A stabilizer for a vehicle suspension has a central rod portion supported so as to be rotatable about its own axis by the vehicle body. An arm portion is coupled to a shock absorber by a connecting link at one end pivotally attached to the end of the arm portion and at the other end pivotally connected to the shock absorber. The pivot point between the arm portion and the connecting link is positioned below the pivot point of the shock absorber and the connecting link and is positioned on the opposite side of the axis of the shock absorber relative to the central rod portion when the vehicle wheel is in a neutral position. The pivot point between the arm portion and the connecting link moves along a locus which has a region such that the minimum distance from the pivot point to the axis of the shock absorber decreases with an increase in the vertical displacement of the vehicle wheel from the neutral position.

3 Claims, 8 Drawing Figures

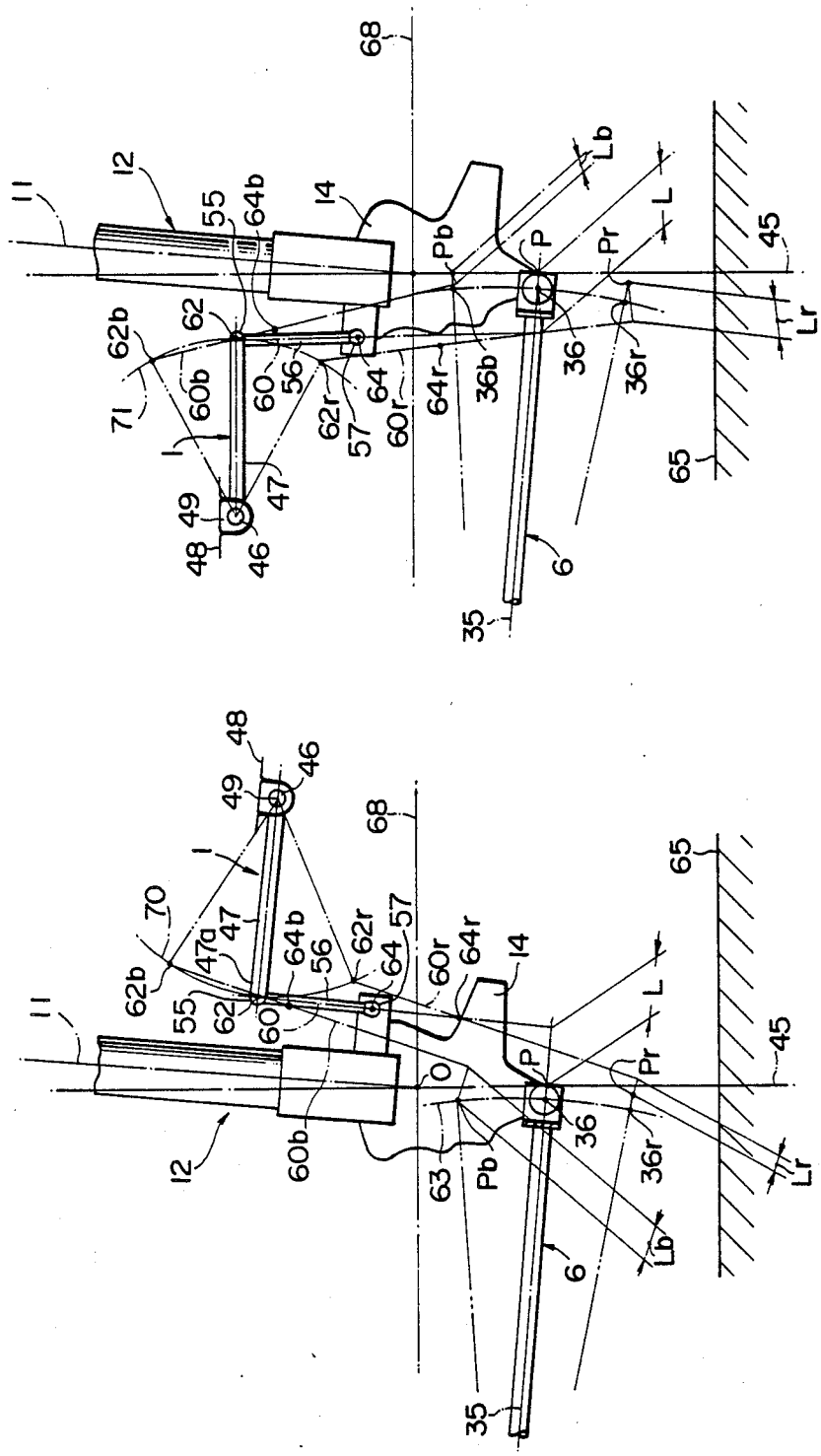

STRUCTURE FOR MOUNTING STABILIZER IN VEHICLE SUSPENSION

BACKGROUND TO THE INVENTION

1. Field of Industrial Application

The present invention relates to the suspension of an automobile or the like, and more particularly relates to a fitting construction for a stabiliser of a vehicle suspension.

2. Prior Art

Already well known as a suspension for a vehicle such as an automobile is a suspension such as a MacPherson strut suspension having: a shock absorber pivotally attached to the vehicle body at the upper end and supporting rotatably the vehicle wheel at the lower end, a suspension arm pivotally coupled between the lower end of the shock absorber and the vehicle body and guiding the vertical displacement of the vehicle wheel, and a link pivotally coupled between the lower end of the shock absorber and the vehicle body and governing movement of the vehicle wheel in the longitudinal direction of the vehicle; such a suspension has been widely adopted as a rear suspension of various vehicles.

In such a suspension, a stabiliser is generally incorporated to increase the roll rigidity of the vehicle and improve the steering stability of the vehicle. The stabiliser is a rodlike elastic member, having a central rod portion oriented laterally of the vehicle, and two arm portions provided at each end of the central rod portion and integral therewith, and forming substantially the shape of three sides of a rectangle; at two positions on the central rod portion close to the arm portions it is supported rotatably about its own axis from the vehicle, the end of each of the two arm portions is coupled to the suspension arm, and when the vehicle is for example rolling the arm portions pivot relatively about the axis of the central rod portion, whereby the central rod portion is elastically twisted, and the suspension arms are urged toward their normal positions by the thus generated spring force.

In order to improve the efficacy of the stabiliser incorporated into such a suspension, it is preferable for the ends of the arms portions of the stabiliser to be coupled at points as far from the point of pivotal attachment to the vehicle body of the suspension arm as possible. By thus improving the efficacy of the stabiliser the vehicle steering stability is further improved, and excessive elastic deformation of the rubber bushes incorporated in the pivots at the ends of the suspension arm caused by the reaction of the stabiliser arm portions is avoided; with the object of improving vehicle ride by these means it has already been practised in some vehicles to couple the stabiliser portion end to the shock absorber by means of a coupling link at one end pivotally attached to the stabiliser arm portion end, and at the other end pivotally attached to a bracket which is rigidly fixed to the shock absorber cylinder, as for example shown in FIG. 2 of the Japanese Utility Model Application Number Sho-59-149744 (1984) which is an application by the same applicant as the applicant of the present application.

PROBLEM TO BE SOLVED BY THE INVENTION

In a suspension incorporating a stabiliser of the construction described above, as the vehicle wheel bounds and rebounds, vertical displacement is transmitted through the shock absorber and connecting link to the ends of the stabiliser arm portions, a spring force is produced by the elastic twisting of the central rod portion of the stabiliser arm, and this spring force increases with an increase in the vertical displacement of the vehicle wheel. The thus generated spring force acts on the shock absorber through the connecting link, and thus urges the shock absorber in the direction of reducing the vertical displacement of the vehicle wheel. Here the spring force acting through the connecting link on the shock absorber (hereafter referred to as the link reaction) does not act along the axis of the shock absorber, but along the axis of the connecting link, as a result of which the shock absorber is subject to a bending moment.

When the link governing the displacement of the vehicle wheel in the longitudinal direction is an element, for example a strut rod, disposed substantially in the longitudinal direction of the vehicle, then the bending moment is proportional to the product of the link reaction and the minimum distance (hereafter referred to as the bending moment arm distance) looking at a projection in the direction lateral of the vehicle from the intersection of the link axis and a vertical line passing through the center of rotation of the vehicle wheel to the axis of the connecting link. When the link governing the displacement of the vehicle wheel in the longitudinal direction consists of a for example A-shaped arm at the vehicle body end pivotally supported by the vehicle body at two or more positions, separated substantially in the longitudinal direction of the vehicle, and at the other end pivotally attached to the lower end of the shock absorber, then the bending moment is proportional to the product of the link reaction and the minimum distance (again referred to as the bending moment arm distance) looking at a projection in the direction lateral of the vehicle from the intersection of a straight line passing through the pivot point of the link and the shock absorber and parallel to the axis of the pivot between the link and the vehicle body, and a vertical line passing through the center of rotation of the vehicle wheel to the axis of the connecting link.

Thus in a conventional suspension, as will be described in detail below with reference to the drawings, the stabiliser is incorporated in such a way that with an increase of the displacement upwards or an increase in the displacement downwards of the vehicle wheel there is an increase in the arm length of the bending moment. Since the link reaction also increases with an increase in the vertical displacement of the vehicle wheel, the value of the bending moment becomes markedly large with an increase in the vertical displacement of the vehicle wheel, the sliding friction resistance between the shock absorber piston and cylinder and between the piston rod and rod guide is excessive, and as a result the shock absorber is unable to carry out its fundamental function adequately, and there is the problem that the vehicle ride is worsened.

The present invention considers the above mentioned problems in a conventional suspension incorporating a stabiliser of the construction described above, and has as its object the provision of an improved stabiliser attachment construction in a suspension by which the bending moment acting on the shock absorber and due to the link reaction is reduced, as a result of which the shock absorber is able adequately to fulfill its fundamental function.

MEANS OF SOLVING THE PROBLEM

The above object is achieved according to the present invention by a stabiliser fitting construction in a vehicle suspension, being a vehicle suspension having a shock absorber extending along its axis substantially in a vertical direction, pivotally attached at its upper end to the vehicle body and at its lower end rotatably supporting a vehicle wheel, a suspension arm coupling pivotally said lower end of said shock absorber and said vehicle body and guiding the vertical displacement of said vehicle wheel, and a link pivotally coupling said lower end of said shock absorber and said vehicle body and governing the displacement in the vehicle longitudinal direction of said vehicle wheel, the stabiliser having a central rod portion extending laterally of the vehicle and at each end of said central rod portion an arm portion formed integrally therewith and forming substantially the shape of three sides of a rectangle, constructed such that: said central rod portion is supported so as to be rotatable about is own axis by the vehicle body, said arm portion is coupled to said shock absorber by a connecting link at one end pivotally attached to the end of said arm portion and at the other end pivotally attached to said shock absorber, looking at a projection in a direction lateral of the vehicle the pivot point between said arm portion and said connecting link is positioned below the pivot point of said shock absorber and said connecting link and is positioned on the opposite side of said axis of said shock absorber to said central rod portion when said vehicle wheel is in the neutral position, and said pivot point between said arm portion and said connecting link moves along a locus which has a region such that the minimum distance from the pivot point to said axis of said shock absorber decreases with an increase in the vertical displacement of said vehicle wheel from said neutral position, and is also achieved by a stabiliser fitting construction in a vehicle suspension, being a vehicle suspension having a shock absorber extending along its axis substantially in a vertical direction, pivotally attached at its upper end to the vehicle body and at its lower end rotatably supporting a vehicle wheel, a suspension arm coupling pivotally said lower end of said shock absorber and said vehicle body and guiding the vertical displacement of said vehicle wheel, and a link pivotally coupling said lower end of said shock absorber and said vehicle body and governing the displacement in the vehicle longitudinal direction of said vehicle wheel, the stabiliser having a central rod portion extending laterally of the vehicle and at each end of said central rod portion an arm portion formed integrally therewith and forming substantially the shape of three sides of a rectangle, constructed such that: said central rod portion is supported so as to be rotatable about its own axis by the vehicle body, said arm portion is coupled to said shock absorber by a connecting link at one end pivotally attached to the end of said arm portions and at the other end pivotally attached to said shock absorber, looking at a projection in a direction lateral of the vehicle the pivot point between said arm portion and said connecting link is positioned above the pivot point of said shock absorber and said connecting link and is positioned on the same side of said axis of said shock absorber as said central rod portion when said vehicle wheel is in the neutral position, and said pivot point between said arm portion and said connecting link moves along a locus which has a region such that the minimum distance from the pivot point to said axis of said shock absorber increases with an increase in the vertical displacement of said vehicle wheel from said neutral position.

EFFECT AND EFFICACY OF THE INVENTION

According to the present invention the pivot point between the stabiliser arm portion and the connecting link is positioned below the pivot point of the shock absorber and the connecting link and is positioned on the opposite side of the axis of the shock absorber to the central rod portion when the vehicle wheel is in the neutral position, and the pivot point between the arm portions and the connecting link moves along a locus which has a region such that the minimum distance to the axis of the shock absorber decreases with an increase in the vertical displacement of the vehicle wheel from the neutral position, or alternatively the pivot point between the stabiliser arm portion and the connecting link is positioned above the pivot point of the shock absorber and the connecting link and is positioned on the same side of the axis of the shock absorber as the central rod portion when the vehicle wheel is in the neutral position, and the pivot point between the arm portions and the connecting link moves along a locus which has a region such that the minimum distance to the axis of the shock absorber increases with an increase in the vertical displacement of the vehicle wheel from the neutral position, as a result of which, looking at a projection in a direction lateral of the vehicle, there is a region where the minimum distance from the point of intersection of the axis of the link and a vertical line through the center of rotation of the vehicle wheel to the axis of the connecting link, or the minimum distance from the point of intersection of a straight line passing through the pivot point between the link and the shock absorber and parallel to the pivotal axis between the link and the vehicle body and a vertical line passing through the axis of rotation of the vehicle wheel to the axis of the connecting link, or in other words the bending moment arm length, decreases with an increase in the vertical displacement of the vehicle wheel. Therefore, by comparison with the conventional case, the bending moment acting on the shock absorber decreases, the sliding frictional resistance between the shock absorber piston and cylinder and piston rod and rod guide is reduced, and the function of the shock absorber can be satisfactorily achieved, so that it is possible for the ride of the vehicle to be improved compared with the conventional case.

In the present specification, "link axis" means the straight line passing through the centers of pivotal attachment at both ends of the link, and "connecting link axis" means the straight line passing through the centers of pivotal attachment at both ends of the connecting link, and the link and connecting link are not necessarily therefore required to be straight line elements.

The present invention is now described in detail, with reference to the attached drawings and in terms of embodiments.

EMBODIMENTS

Figure 1:
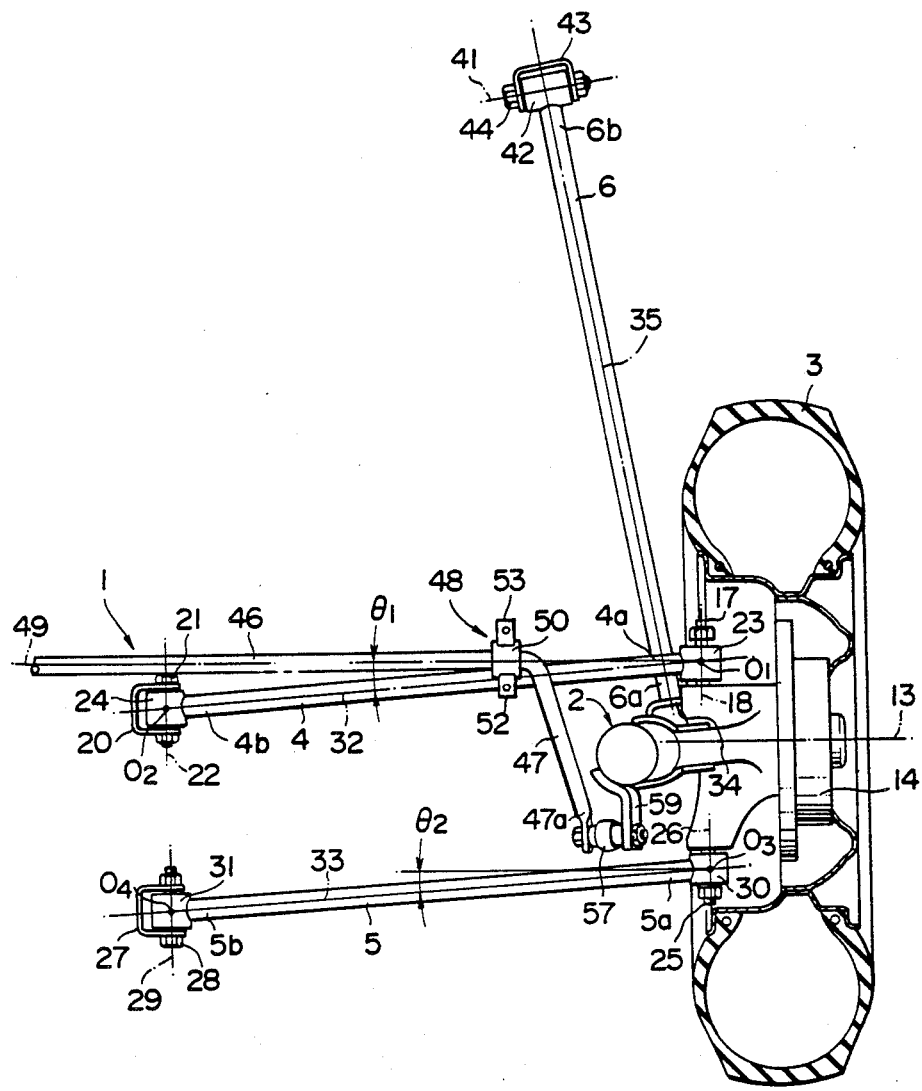
FIG. 1 is a plan view of a dual link strut type suspension for a front wheel drive vehicle incorporating a stabiliser according to one embodiment of the fitting construction of the present invention.
Figure 2:
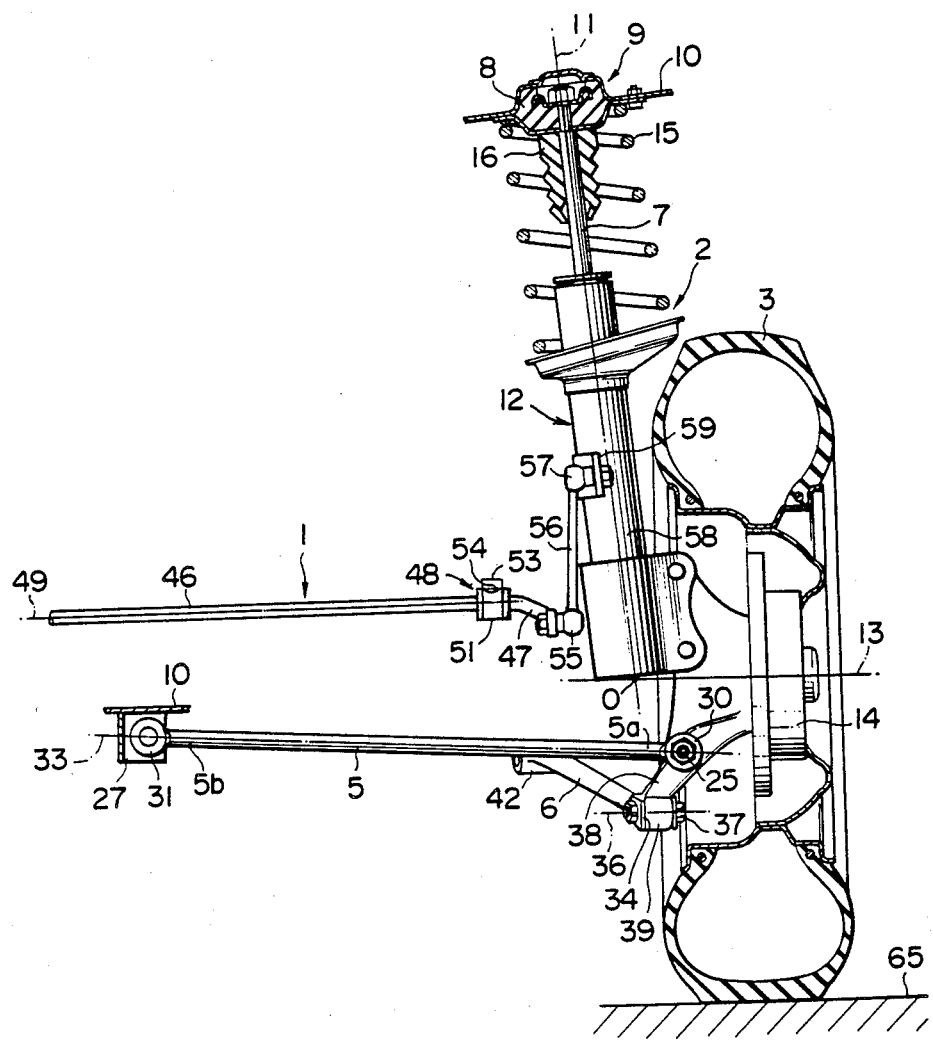
FIGS. 2 and 3 are respectively an elevation looking from the rear of the vehicle and a schematic elevation looking at a projection in a direction lateral of the vehicle from the inboard side of the vehicle of the suspension shown in FIG. 1.
Figure 3:
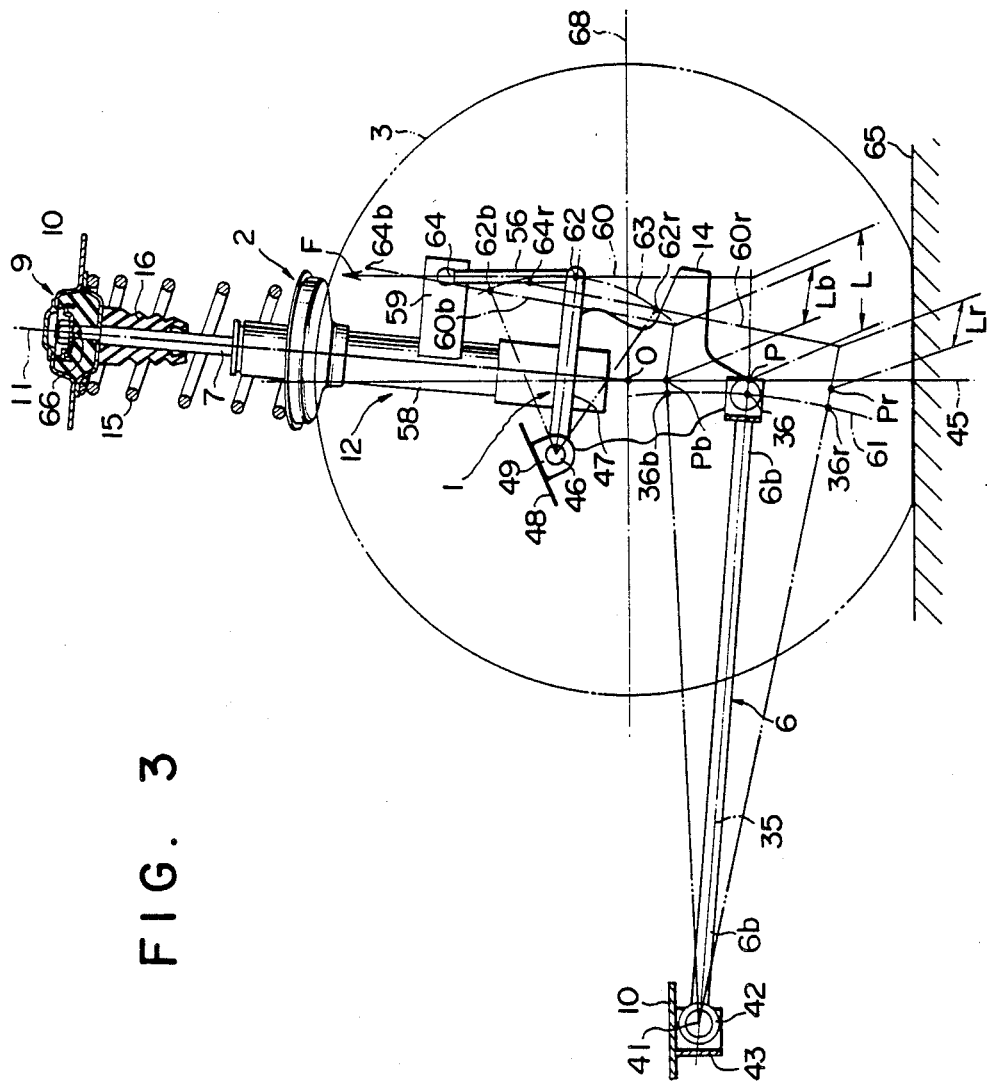

The dual link strut type suspension shown in FIGS. 1 to 3 is constructed, in order to reduce the elastic deformation of the rubber bushes incorporated at both ends of the strut rod when the vehicle is turning, and thus to improve the ride of the vehicle when turning, according to the invention disclosed in Japanese Utility Model Application Number Sho-59-127767 (1984) which is an application by the same applicant as the applicant of the present application.

In FIGS. 1 to 3, 1 shows a stabiliser, and 2 shows a strut which at its lower end rotatably supports a vehicle wheel 3. 4 and 5 indicate a pair of suspension arms separated in the vehicle longitudinal direction, extending substantially in a direction lateral of the vehicle and cooperating to form a control arm, and 6 shows a strut rod extending substantially in the vehicle longitudinal direction and acting as a link to govern the displacement in the vehicle longitudinal direction of the vehicle wheel 3.

The strut 2 includes a shock absorber 12 pivotally attached at the upper end of a piston rod 7 to the vehicle body 10 by an upper support 9 including a cushion rubber 8 and extending along an axis 11, a vehicle wheel support member 14 fixed rigidly to the lower end of said shock absorber and supporting the vehicle wheel 3 rotatably about an axis of rotation 13 extending substantially in a direction lateral of the vehicle, a suspension spring consisting of a compression coil spring 15, and a bound stopper 16 governing excess bound of the vehicle wheel 3. The axis 11 and the axis of rotation 13 intersect each other at point of intersection O.

The suspension arm 4 is coupled at a first end 4a to the vehicle wheel support member 14 by a bolt 17 fixed to the vehicle wheel support member s as to be pivotable about a pivotal axis 18 extending substantially in the vehicle longitudinal direction, and is coupled at the second end 4b to the vehicle body 10 by a bolt 21 supported by a U-section bracket 20 fixed to the vehicle body 10 so as to be pivotable about a pivotal axis 22 parallel to the pivotal axis 18. At the first end 4a of the suspension arm 4 is provided fixedly a tube 23 extending in a crosswise direction, through the tube 23 are passed the bolt 17 and a cylindrical collar fitting over the bolt, and between the tube 23 and the collar is disposed a cylindrical rubber bush not shown in the drawings. At the second end 4b of the suspension arm 4 is provided fixedly a tube 24 extending in a crosswise direction, through the tube 24 are passed the bolt 21 and a cylindrical collar fitting over the bolt, and between the tube 24 and the collar is disposed a cylindrical rubber bush not shown in the drawings.

Similarly, the suspension arm 5 is coupled at a first end 5a to the vehicle wheel support member 14 by a bolt 25 fixed to the vehicle wheel support member so as to be pivotable about a pivotal axis 26 extending substantially in the vehicle longitudinal direction and aligned with the pivotal axis 18, and is coupled at the second end 5b to the vehicle body by a bolt 28 supported by a U-section bracket 20 fixed to the vehicle body 10 so as to be pivotable about a pivotal axis 29 aligned with the pivotal axis 22. At the first end 5a of the suspension arm 5 is provided fixedly a tube 30 extending in a crosswise direction, through the tube 30 are passed the bolt 25 and a cylindrical collar fitting over the bolt, and between the tube 30 and the collar is disposed a cylindrical rubber bush not shown in the drawings. At the second end 5b of the suspension arm 5 is provided fixedly a tube 31 extending in a crosswise direction, through the tube 31 are passed the bolt 28 and a cylindrical collar fitting over the bolt, and between the tube 31 and the collar is disposed a cylindrical rubber bush not shown in the drawings.

Looking from their first ends toward their second ends the suspension arms 4 and 5 are inclined slightly toward the rear of the vehicle and upward, and the suspension arms 4 and 5 are parallel to each other. Therefore, if the angle of inclination toward the rear of the vehicle with respect to the direction lateral of the vehicle of the axis 32 of the suspension arm 4 is theta 1 and the angle of inclination toward the rear of the vehicle with respect to the direction lateral of the vehicle of the axis 33 of the suspension arm 5 is theta 2, then theta 1 greater than 0 and theta 2 greater than 0 hold, and theta 1=theta 2. Moreover the effective length of the suspension arm 4, in other words the distance between the point of intersection O1 of the axis 32 and the pivotal axis 18 and the point of intersection O2 of the axis 32 and the pivotal axis 22 is equal to the effective length of the suspension arm 5, in other words the distance between the point of intersection O3 of the axis 33 and the pivotal axis 26 and the point of intersection O4 of the axis 33 and the pivotal axis 29. Therefore when, for example during sudden braking or sudden acceleration of the vehicle, a load acts on the vehicle wheel 3 in the vehicle longitudinal direction and causes the suspension arms 4 and 5 to move in the vehicle longitudinal direction about the points of intersection O2 and O4, the suspension arms 4 and 5 are maintained parallel and therefore the toe of the vehicle wheel 3 is not changed, and satisfactory straight line driving characteristics of the vehicle are maintained.

Moreover the first ends 4a and 5a are coupled to the vehicle wheel support member 14 at positions lower than and respectively in front of and to the rear of the axis of rotation 13. Again, the distance between the point of intersection O1 and the axis of rotation 13 is less than the distance between the point of intersection O3. Therefore, when the vehicle is turning and the vehicle wheel 3 is the outer wheel the vehicle wheel support member 14 will be pressed to the left as seen in FIG. 1 by the side force acting on the vehicle wheel in the inboard direction, and in this case the rubber bushes provided at both ends of the suspension arm 4 will undergo greater compressive deformation than the rubber bushes provided at both ends of the suspension arm 5, as a result of which the toe of the vehicle wheel 3 will be changed in the toe-in direction, and this will ensure the satisfactory understeer characteristics of the vehicle.

At a first end 6a of the strut rod 6 is fixedly provided a yoke 34, and through the yoke is passed a bolt 37 lying along a pivotal axis 36 extending at right angles to the axis 35 of the strut rod. At the end of an arm 38 provided integrally with the vehicle wheel support member 14 substantially below the axis of rotation 13 and projecting downward is provided integrally a tube 39 and through the tube 39 are passed the bolt 37 and a cylindrical collar fitting over the bolt. Between the tube 39 and the collar is disposed a cylindrical rubber bush not shown in the drawings. At the second end 6b of the strut rod 6 is fixedly provided crosswise thereto a tube 42 extending along a pivotal axis 41 parallel to the pivotal axis 36. Through the tube 42 are passed a bolt 44 and a cylindrical collar fitting over the bolt which are supported by a U-section bracket 43 fixed to the vehicle body 10, and between the tube 42 and the collar is disposed a cylindrical rubber bush not shown in the drawings.

In a dual link strut type suspension thus constructed, the suspension arms 4 and 5 can not only produce a reaction force to the component in the direction lateral of the vehicle of the friction force acting on the point of contact with the ground of the rear wheel which is on the outside when the vehicle is turning, but can also produce a reaction force to the component of the friction force toward the rear of the vehicle. Therefore, the load acting axially on the strut rod 6 is lightened or removed, and elastic deformation of the rubber bushes provided at both ends of the strut rod is substantially avoided, as a result of which even if in this state an impact acts on the vehicle wheel toward the rear of the vehicle, the rubber bushes provided at both ends of the strut rod will be able to fulfill adequately their basic function of shock absorption, the impact will be effectively absorbed, and the ride of the vehicle while turning will be improved. It is sufficient for this objective to be achieved for theta 1+theta 2 to be positive, and for more details of this effect reference should be made to Japanese Utility Model Application Number Sho-59-127767 (1984).

The stabiliser 1 has a central rod portion 46 to the forward direction of the vehicle of the strut 2 as seen in FIG. 3, in order words on the same side as the strut rod 6 and disposed substantially in the direction lateral of the vehicle, and at both ends of the central rod portion a pair of arm portions 47 provided integrally therewith. The central rod portion 46 is fitted at two positions close to the arm portions 47 to the vehicle body 10 by a pair of fitting devices 48 so as to be rotatable about its own axis 49. Each fitting device comprises a D-shaped rubber bush having a through hole to receive the central rod portion 46 and a fitting bracket 53 having a U-shaped strip 51 with a pair of flange portions 52 provided integrally at both ends, and the fitting bracket straddles the rubber bush with the U-shaped strip 51 and is fastened to the vehicle body 10 by a pair of bolts 54 at the flange portions.

Each arm portion 47 is inclined slightly downward looking at FIG. 3 from the central rod portion end to the end 47a. The end 47a of each arm portion 47 is, in the embodiment shown in the drawings, pivotally attached to the lower end of a connecting link 56 extending substantially vertically, through a ball joint 55 on the vehicle rearward side of the axis 11 of the shock absorber 12, and the upper end of the connecting link is pivotally attached to a bracket 59 rigidly fixed to a cylinder 58 of the shock absorber 12 through a ball joint 57.

Thus when the vehicle is rolling, as the vehicle wheel moves vertically because of the bound and rebound, the vehicle wheel support member 14 and the cylinder 58 of the shock absorber 12 are displaced vertically, the shock absorber 12 is extended or compressed, the displacement of the cylinder 58 is transmitted through the bracket 59 and connecting link 56 to the end 47a of the arm portion 47, and the arm portion is thereby driven about the axis 49 with respect to the central rod portion 46, elastically twisting the central rod portion, whereby a spring force is generated. The thus generated spring force is transmitted through the arm portion 47, connecting link 56, and bracket 59 to the cylinder 58 of the shock absorber 12, and thus the vehicle wheel support member 14 and so forth are urged toward their normal positions.

In this case, the force transmitted from the stabiliser 1 through the connecting link 56 and so forth to the shock absorber 12, in other words the link reaction F, acts at the ball joint 57 along the axis 60 of the connecting link 56, and generates a bending moment M on the shock absorber. This bending moment M is proportional to the product of the link reaction F and the minimum distance from the point of intersection P of the axis 35 of the strut rod 6 and a vertical line 45 to the axis 60 of the connecting link 56, or in other words the distance L from the point of intersection P to a perpendicular descending from the axis 60. The link reaction F increases with an increase in the pivoting angle of the arm portion 47 of the stabiliser 1 with respect to the central rod portion 46; the angle of the axis 60 also changes with the vertical displacement of the vehicle wheel, and the arm length L of the bending moment M also changes, so that the bending movement M also changes with the vertical displacement of the vehicle wheel. In other words, as the vehicle wheel 3 is moved vertically by the bound and rebound, the strut end pivotal axis 36 and the axis 35 are displaced along a locus 61 which is an arc of a circle with the vehicle body end pivotal axis 41 of the strut rod as center, the center 62 of the ball joint 55 attached to the end of the arm portion 47 moves through a locus which is an arc of a circle with the axis 49 of the central rod portion 46 of the stabiliser 1 as center, and the center 64 of the ball joint 57 moves substantially in a vertical direction; the minimum distance from the center 62 to the axis 11 of the shock absorber 12 is maximal when the vehicle wheel is substantially in the neutral position, and decreases gradually as the vertical displacement of the vehicle wheel 3 from its neutral position increases.

If now the positions of the axis 36 in the cases where the vehicle wheel 3 is in the maximum permitted bound position and the maximum permitted rebound position are denoted by 36b and 36r respectively, then the center 62 of the ball joint 55 will be displaced to the positions shown in FIG. 3 as 62b and 62r respectively, the point of intersection P will be displaced to the positions shown in FIG. 3 as Pb and Pr respectively (in this case the vertical line 45 will also be displaced slightly in the vehicle longitudinal direction, or in other words to right or left as seen in FIG. 3), the center 64 of the ball joint 57 will be displaced to the positions shown as 64b and 64r respectively, and therefore the axis 60 of the connecting link 56 will be displaced to the positions shown as 60b and 60r respectively.

Therefore the arm length L of the bending moment M acting on the shock absorber 12 becomes respectively Lb and Lr, and therefore as the vehicle wheel 3 is displaced from its neutral position to the maximum permitted bound position or is displaced from its neutral position to the maximum permitted rebound position the arm length of the bending moment decreases gradually from L to Lb or from L to Lr respectively. Thus even if the link reaction F increases with an increase in the pivoting angle of the arm portion 47 of the stabiliser 1 with respect to the central rod portion 46, since the arm length L of the bending moment decreases at the same time, the bending moment which is given by M proportional to the product of F and L does not reach a very high value over the whole range of vertical displacement of the vehicle wheel 3, and a diminution in the quality of ride of the vehicle due to an increase in the sliding frictional resistance between the piston and cylinder of the shock absorber 12 and between the piston rod 7 and the rod guide can be avoided.

Figure 4:
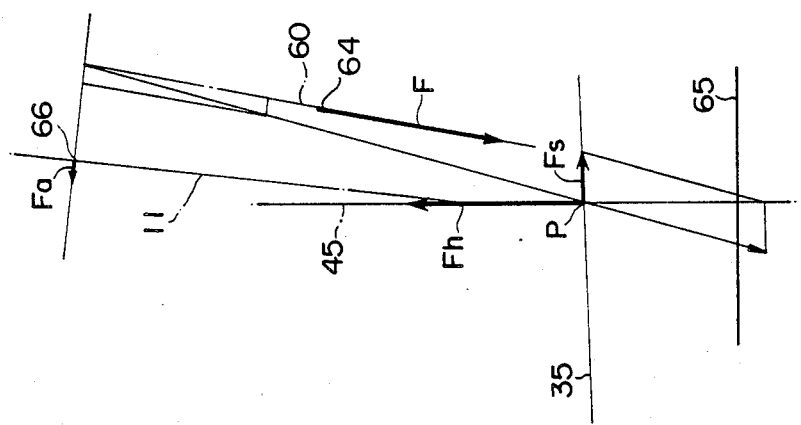
FIG. 4 is a schematic diagram in a projection in a direction lateral of the vehicle from the inboard side of the vehicle showing the pattern of forces acting on the strut in the case that the vehicle wheel is in the maximum permitted bound position in the suspension shown in FIG. 3.

The pattern of forces acting on the strut 2 when the vehicle wheel 3 is in the maximum permitted bound position is shown in FIG. 4. In FIG. 4 Fh indicates the reaction received by the vehicle wheel 3 from the road surface 65, which may be considered as acting at the point of intersection P upward along the vertical line 45, Fs indicates the reaction from the strut rod which may be considered as acting at the point of intersection P along the axis 35 to the right in the drawing, Fa indicates the reaction from the upper support which may be considered as acting at the center 66 of the upper support 9 to the left in the drawing, and F indicates the link reaction acting at the center 64 of the ball joint 57. In FIG. 4, the resultant of the reactions Fh and Fs and the resultant of the reactions F and Fa are in a balanced state. Although not shown in the drawing, taking 11 to be the distance from the center 66 of the upper support 9 to the center of the shock absorber piston and 12 to be the distance from the center 66 to the center of the rod guide, the force F1 acting between the piston of the shock absorber 12 and the cylinder 58 and the force F2 acting between the piston rod 7 and the rod guide are given by:

$$F1 = Fa \times 12/(11-12)$$

$$F2 = Fa \times 11/(11-12)$$

and therefore the above described sliding frictional resistance forces between the elements are equal to the forces F1 and F2 multiplied by the respective coefficients of friction. According to the embodiment shown in the drawings the force Fa will have an extremely low value, so that these frictional resistances will have extremely low values, and therefore obstruction of the effect of the shock absorber and the resulting worsening of the vehicle ride will be positively avoided.

Figure 5:
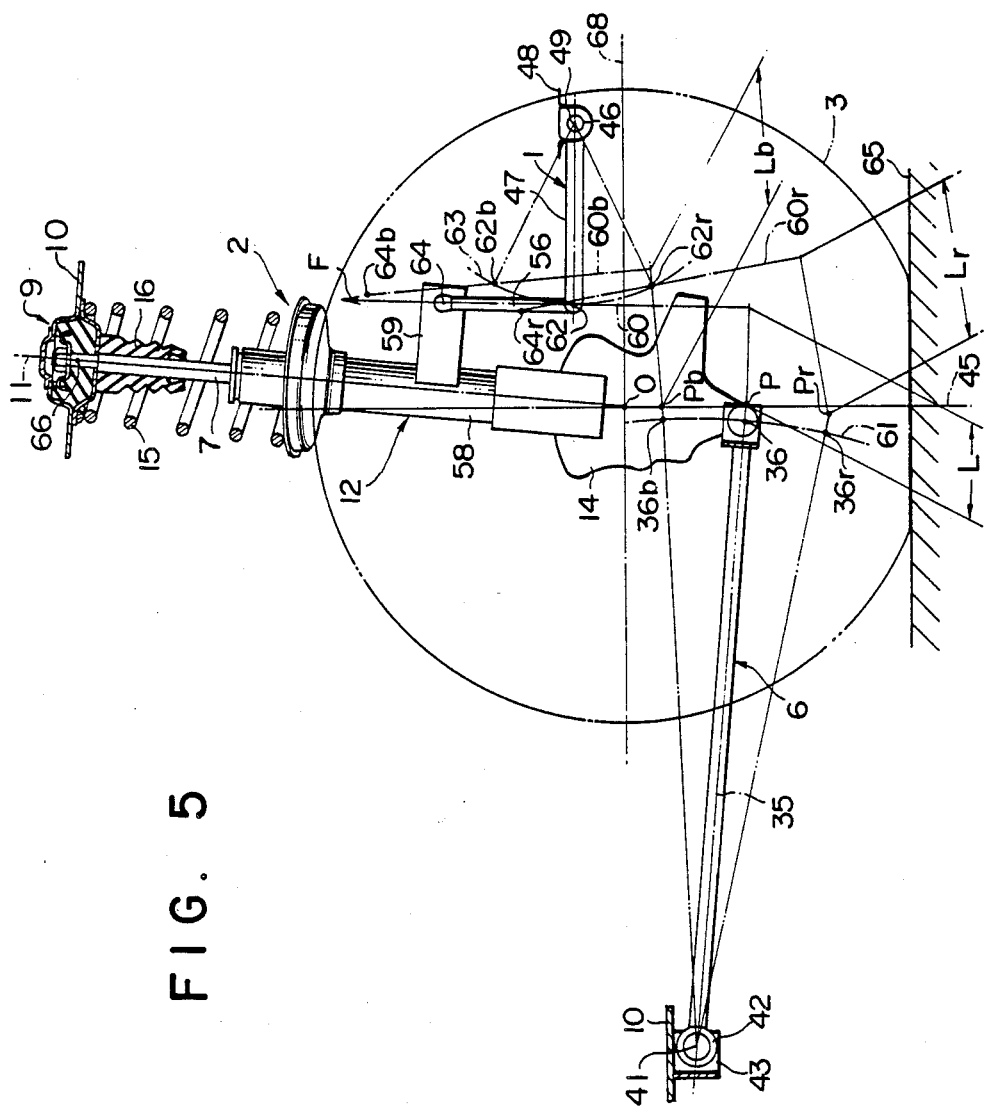
FIG. 5 is a schematic elevation similar to FIG. 3 looking at a projection in a direction lateral of the vehicle from the inboard side of the vehicle of a dual strut type rear suspension for a front wheel drive vehicle incorporating a stabiliser according to a conventional fitting construction; and each of FIGS. 6 to 8 is a schematic partial elevation showing a projection in a direction lateral of the vehicle from the inboard side of the vehicle of another embodiment of the stabiliser fitting construction according to the present invention.

FIG. 5 is a schematic elevation similar to FIG. 3 looking at a projection in a direction lateral of the vehicle from the inboard side of the vehicle of a dual strut type rear suspension for a front wheel drive vehicle incorporating a stabiliser according to a conventional fitting construction. In FIG. 5 elements substantially the same as elements in FIG. 3 are assigned the same reference numerals.

In the suspension shown in FIG. 5 also, the road wheel end pivotal axis 36 of the strut rod 6 describes a locus 61 which is an arc of a circle having the vehicle body end pivotal axis 41 of the strut as center, the center 62 of the ball joint 55 describes a locus 63 which is an arc of a circle having the axis 49 of the central rod portion 46 of the stabiliser 1 as center, and the center 64 of the ball joint 57 moves substantially vertically.

In the suspension shown in FIG. 5, however, since the center 62 is positioned lower than the center 64 and when the vehicle wheel is in the neutral position is positioned on the same side of the axis 11 of the shock absorber 12 as the central rod portion 46, the center 62 moves along a locus of motion such that the minimum distance to the axis 11 of the shock absorber substantially increases gradually as the vertical displacement of the vehicle wheel increases. Therefore, when the vehicle wheel 3 is displaced to the maximum permitted bound position or to the maximum permitted rebound position, the center 62 of the ball joint 55 is displaced to the position shown as 62b or 62r respectively, and therefore as the vehicle wheel 3 moves from its neutral position to the maximum permitted bound position or from its neutral position to the maximum permitted rebound position, the arm length of the bending moment M acting on the shock absorber 12 substantially increases gradually from L to Lb or from L to Lr. Since as described above the link reaction F increases with an increase in the pivot angle of the arm portion 47 of the stabiliser 1 with respect to the central rod portion 46, the bending moment M acting on the shock absorber 12 increases sharply with an increase in the vertical displacement of the vehicle wheel 3, and as a result the sliding frictional resistance between the piston of the shock absorber 12 and the cylinder 58 and between the piston rod 7 and the rod guide Hi would becomes excessive, the function of the shock absorber 12 is impaired, and thus the vehicle ride is worsened.

Figure 6:
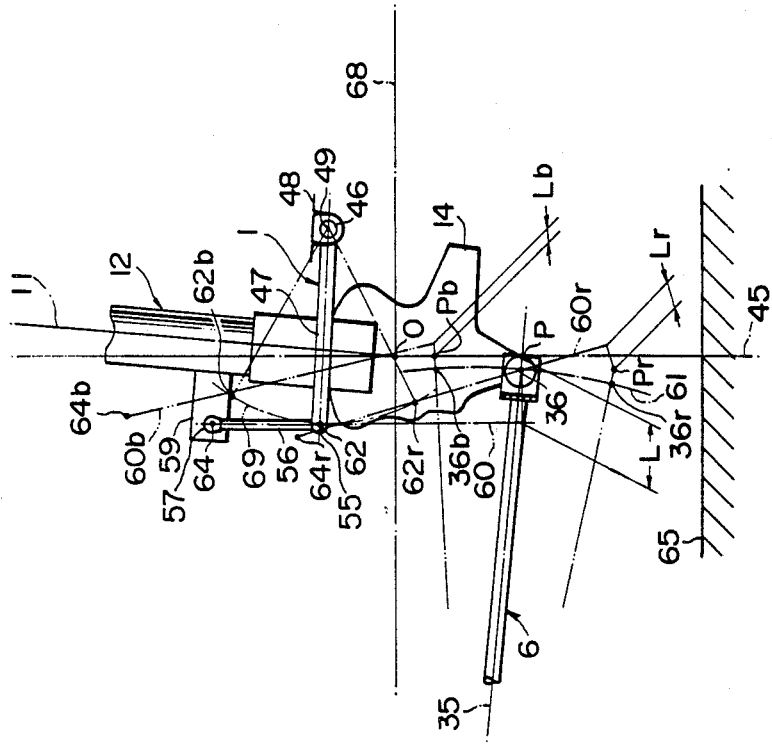

Each of FIGS. 6 to 8 is a schematic partial elevation looking at a projection in a direction lateral of the vehicle from the inboard side of the vehicle of another embodiment of the stabiliser fitting construction according to the present invention. In these figures elements elements substantially the same as elements in FIG. 3 are assigned the same reference numerals.

In the embodiment shown in FIG. 6, the central rod portion 46 of the stabiliser 1 is positioned on the opposite side of the strut 2 from the strut rod 6, the arm portion 47 extends substantially parallel to a phantom horizontal line 68 as seen in FIG. 6 passing through the axis of rotation 13 of the vehicle wheel 3, and the connecting link 56 extends, on the same side of the strut 2 as the strut rod 6 upward from the ball joint 55 to the ball joint 57 substantially parallel to the vertical line 45 as seen in FIG. 6. Therefore, the center 62 of the ball joint 55 is positioned below the center 64 of the ball joint 57, and when the vehicle wheel is in the neutral position is positioned on the opposite side of the axis 11 of the shock absorber 12 to the central rod portion 46 of the stabiliser position; the minimum distance to the axis 11 of the shock absorber is maximum when the vehicle wheel is in the neutral position or close thereto, and substantially gradually decreases with an increase in the vertical displacement of the vehicle wheel.

In the embodiment shown in FIG. 7, the stabiliser 1 is provided on the opposite side of the strut 2 from the strut rod 6, the arm portion 47 is inclined slightly upward from the central rod portion 46 toward the end 47a, and the connecting link 56 extends downward substantially along the axis 11 as seen in FIG. 7 from the ball joint 55 to the ball joint 57. Therefore, the center 62 of the ball joint 55 is positioned above the center 64 of the ball joint 57, and when the vehicle wheel is in the neutral position is positioned on the same side of the axis 11 of the shock absorber 12 as the central rod portion 46 of the stabiliser 1; the minimum distance from the center 62 to the axis 11 of the shock absorber is minimum when the vehicle wheel is in the neutral position or close thereto, and substantially gradually increases with an increase in the vertical displacement of the vehicle wheel.

In the embodiment shown in FIG. 8, the stabiliser 1 is provided on the same side of the strut 2 as the strut rod 6, the arm portion 47 extends substantially parallel to a phantom horizontal line 68 as seen in FIG. 8, and the connecting link 56 extends downward substantially parallel to the vertical line 45 as seen in FIG. 8 from the ball joint 55 to the ball joint 57. Therefore, the center 62 of the ball joint 55 is positioned above the center 64 of the ball joint 57, and when the vehicle wheel is in the neutral position is positioned on the same side of the axis 11 of the shock absorber 12 as the central rod portion 46 of the stabiliser 1; the minimum distance from the center 62 to the axis 11 of the shock absorber is minimum when the vehicle wheel is in the neutral position or close thereto, and substantially gradually increases with an increase in the vertical displacement of the vehicle wheel.

In each of these embodiments the center 62 of the ball joint 55 moves along a locus 69 to 71 respectively which is an arc of a circle having as center the axis 49 of the central rod portion 46 of the stabiliser 1, and as the vehicle wheel is displaced vertically from its neutral position to the maximum permitted bound position or to the maximum permitted rebound position, with the increase in the vertical displacement of the vehicle wheel the arm length of the bending moment acting on the shock absorber 12 substantially decreases gradually from L to Lb or from L to Lr respectively. Therefore in these embodiments also, even if the vehicle wheel is displaced vertically by the bound and rebound, the bending moment acting on the shock absorber does not reach a very high value, an increase in the sliding frictional resistance between the piston and cylinder of the shock absorber and between the piston rod and the rod guide is avoided, and thereby the ride of the vehicle is improved compared with the case of the conventional suspension as shown in FIG. 5.

The present invention has been described in detail above in terms of a number of embodiments applied to the dual link strut type rear suspension disclosed in the abovementioned Japanese Utility Model Application Number Sho-59-127767 (1984), but the present invention is not limited to these embodiments; for example, at least one of the suspension arms 4 and 5 and the strut 6 in the embodiments shown in the drawings may be replaced by an I-shaped arm at one end pivotally attached to the lower end of the shock absorber and at the other end pivotally attached to the vehicle body and extending substantially in a direction lateral of the vehicle and a rod pivotally coupled between the I-shaped arm and the vehicle body and extending substantially in the vehicle longitudinal direction, or alternatively by an A-shaped arm at one end pivotally attached to the lower end of the shock absorber, at the other end pivotally attached at two or more points separated in the vehicle longitudinal direction, and extending substantially in a direction lateral of the vehicle, or again at least one of the suspension arms 4 and 5 may be replaced by a reverse A-shaped arm at one end pivotally attached to the lower end of the shock absorber of two points separated in the vehicle longitudinal direction so as to be pivotable about a common axis and extending substantially in a direction lateral of the vehicle. The present invention, moreover, is applicable also to any other suspension such as for example a double wishbone type suspension, provided only that it includes a shock absorber extending along a substantially vertical axis, at its upper end pivotally attached to the vehicle body, and at its lower end rotatably supporting a vehicle wheel, a suspension arm pivotally coupled between the lower end of the shock absorber and the vehicle body and guiding the vertical displacement of the vehicle wheel, and a link pivotally coupled between the lower end of the shock absorber and the vehicle body and governing the displacement in the vehicle longitudinal direction of the vehicle wheel.

I claim:

1. A stabilizer construction for a suspension of a vehicle having a vehicle body and wheels, said suspension including a bearing means for rotationally supporting one of said wheels, a cylinder-piston type shock absorber extending along a substantially vertically arranged longitudinal axis thereof with a cylinder member thereof supporting said bearing means and firmly connected therewith and a piston member thereof extending upwardly from said cylinder member and being supported from said vehicle body, and a means for guiding the combination of said cylinder member and said bearing means to be movable up and down relative to said vehicle body for bounding and rebounding, said guiding means including a suspension member pivotably connected to said vehicle body at one end thereof and to said combination of said cylinder member and said bearing means at another end thereof so as to apply a force to said combination of said cylinder member and said bearing means along a line extending in a longitudinal direction of said vehicle body for restricting forward and rearward movement of said combination of said cylinder member and said bearing means in said longitudinal direction of said vehicle body, said stabilizer construction comprising:

a stabilizer having a central bar portion mounted to said vehicle body so as to extend transversely relative to said longitudinal direction of said vehicle body and an arm portion extending from one end of said central bar portion substantially at a right angle relative thereto, a link, and a bracket extending from the combination of said cylinder member and said bearing means to a free end thereof transversely spaced from the longitudinal axis of said shock absorber, a free end of said arm portion of said stabilizer being pivotably connected with one end of said link while another end of said link is pivotably connected with said bracket at a portion thereof adjacent said free end thereof so that bounding and rebounding movement of said combination of said cylinder member and said bearing means relative to said vehicle body from a neutral position thereof causes twisting of said central bar portion of said stabilizer, wherein, as viewed in a direction transverse to said longitudinal direction of said vehicle body, said arm portion of said stabilizer is positioned to cross said shock absorber longitudinal axis so that said central bar portion and said free end of said arm portion thereof are located on opposite sides of said shock absorber longitudinal axis, wherein said arm portion of said stabilizer extends to be substantially at a right angle to the longitudinal axis of said shock absorber when said combination of said cylinder member and said bearing means is at a neutral position of said bounding and rebounding relative to said vehicle body, wherein the pivotable connection between said arm portion of said stabilizer and said link is positioned above a point of intersection between a vertical line passing through a center of rotation of said one wheel supported by said bearing means and said line along which said force for restricting forward and rearward movement of said combination of said cylinder member and said bearing means relative to said vehicle body is applied, and wherein the pivotable connection between said link and said bracket is positioned above said pivotable connection between said link and said arm portion of said stabilizer.

2. A stabilizer construction according to claim 1, wherein, as viewed in said direction transverse to said vehicle body, said link extends to be substantially parallel with the longitudinal axis of said shock absorber when said combination of said cylinder member and said bearing means is at said neutral position of bounding and rebounding thereof relative to said vehicle body.

3. A stabilizer construction according to claim 1, wherein, as viewed in said direction transverse to said vehicle body, said arm portion of said stabilizer, said link and said bracket are located above said center of rotation of said one wheel defined in said bearing means, while said point of intersection between said vertical line passing through said center of rotation of said one wheel and said line along which said force for restricting forward and rearward movement of said combination of said cylinder member and said bearing means relative to said vehicle body is applied is located below said center of rotation of said one wheel, when said combination of said cylinder member and said bearing means is at said neutral position of bounding and rebounding thereof relative to said vehicle body.

* * * * *